United States Patent [19]

Cascio

[11] Patent Number: 5,547,304
[45] Date of Patent: Aug. 20, 1996

[54] CONNECTOR UNIT, PARTICULARLY OF THE MULTIPLE-CONNECTION RAPID-ENGAGEMENT TYPE

[75] Inventor: Franco Cascio, Vercelli, Italy

[73] Assignee: IF-1 S.r.l., Vercelli, Italy

[21] Appl. No.: 354,763

[22] Filed: Dec. 12, 1994

[30] Foreign Application Priority Data

Oct. 12, 1993 [IT] Italy ................................ TO93A0939

[51] Int. Cl.⁶ ................................ B25G 3/00; F16D 1/12; G01M 15/00
[52] U.S. Cl. .................... 403/13; 403/80; 403/120; 403/163; 73/116; 73/117.2; 73/119 R
[58] Field of Search ................................ 403/13, 80, 120, 403/151, 161, 162, 163; 285/24, 28, 61, 137.1; 248/179, 286; 73/117.2, 119 R, 116; 269/255, 256, 258, 86, 139, 140, 164, 208, 209, 210, 265, 275

[56] References Cited

U.S. PATENT DOCUMENTS 4,252,304 2/1981 Pettican ................................ 269/139
4,879,930 11/1989 Von Haas ................................ 403/13 X Primary Examiner—Blair Johnson
Assistant Examiner—Bruce A. Lev
Attorney, Agent, or Firm—Sughrue, Mion, Zinn, Macpeak & Seas

[57] ABSTRACT

A connector unit of the multiple-connection, rapid-engagement type includes a first connector part and a second connector part which can be coupled face to face as a result of a relative movement along a general axis of the first connector part. The second connector part is carried by a movable body adapted to stop close to the first connector part so that these face each other. The connector parts include mutual centring means. One of these two connector parts is movable transverse the direction of coupling to compensate for any transverse misalignment relative to this direction. The movable connector part is carried by an auxiliary support structure with the interposition of resiliently yielding members so as to be swingable relative to the support structure. These resilient members are preloaded so as, in their undeformed condition, to define a rest position corresponding to the aligned condition of the two connector parts.

11 Claims, 4 Drawing Sheets

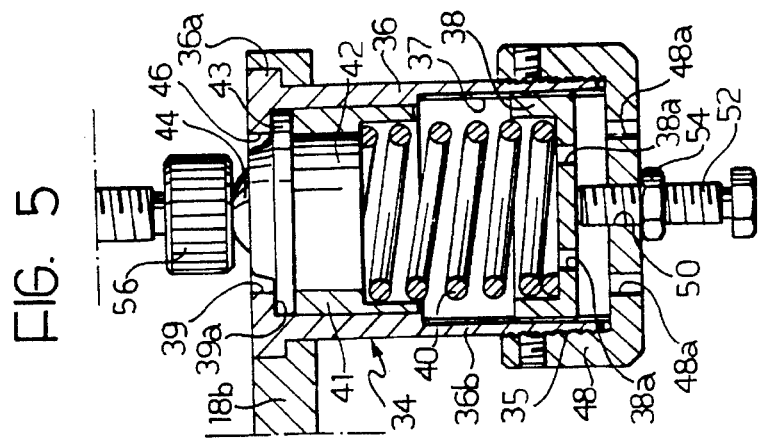
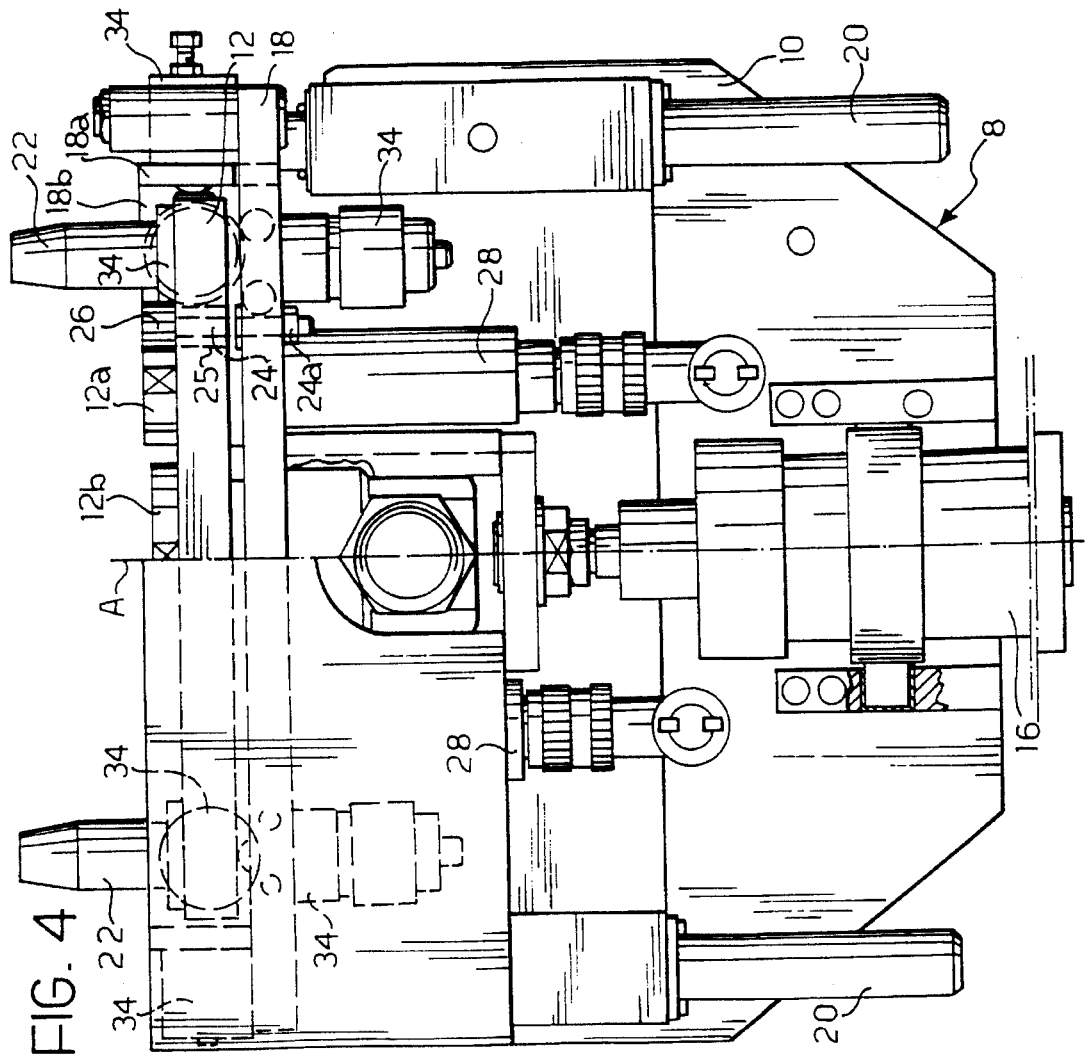

CONNECTOR UNIT, PARTICULARLY OF THE MULTIPLE-CONNECTION RAPID-ENGAGEMENT TYPE

BACKGROUND OF THE INVENTION

The present invention relates to a connector unit, particularly of the multiple-connection, rapid-engagement type, comprising a first connector part and a second connector part which can be coupled face to face as a result of a relative movement along a direction of coupling defined by a general axis of the first connector part, in which the second connector part is carried by a movable body adapted to stop close to the first connector part so that the first and second connector parts substantially face each other, these connector parts having means for mutually centring them on the direction of coupling, and at least one of the connector parts being movable transverse the direction of coupling so that, during coupling with the other connector part, the transversely-movable connector part can compensate for any transverse misalignment with the direction of coupling.

Connector units of the type indicated above are used, for example, in test lines for engines. Such lines generally include a plurality of platforms, or pallets, movable along a predetermined path and each carrying a respective engine rigidly fixed thereto.

Each pallet is adapted to stop at a plurality of test stations each of which includes means for collecting data for the test to be carried out and is adapted to supply electrically or with fluids the engine, totally independently, so that the test may be carried out successfully.

Since it is not economic to bring each pallet to a stop at an extremely precise position at each test station as the pallet is movable along sliding guides with clearances, or play, both to allow the pallet to travel around curved paths and because of inevitable wear to parts of the system as a whole, it is preferred to allow the pallets to stop at positions which are not defined too precisely at each station. For this reason, the two connector parts must be made to compensate for any misalignments with the ideal direction of coupling due to the said clearances.

In some known systems the connector part associated with the pallet is formed as a plate and mounted on the pallet so as to be movable transverse the direction of coupling of the two connector parts. More particularly, the pallet has a plurality of pins which project parallel to the direction of coupling and engage in slots in the connector plate. These slots have dimensions which are considerably bigger than the pins so that there are clearances between the pins and the peripheries of the slots.

Since the two connector parts have, in known manner, mutual centring members, for example of the tapered pin/reference hole type, during the coupling phase the connector part associated with the pallet compensates for any misalignment with the correct direction of coupling by means of transverse movements allowed by the clearances between the pins and the peripheries of the slots.

Naturally, when the connector parts are not coupled, the connector plate associated with the pallet moves under gravity into an extreme, rest position which is spaced from the design position for the coupling of the connector parts, in which rest position the pins mentioned above contact a portion of the periphery of the respective slot.

Connector parts of the known type mentioned above are, however, subject to wear, particularly the centring members which, proportionally, are subject to greater impulsive forces during the mutual coupling of the connector parts. These forces are due mainly to the inertia of the system, friction and loads generated by the springs in the valve units present at the ends of the pressurised-fluid supply ducts. This wear is particularly dangerous in that, after a variable number of cycles, it makes the centring of the connector parts during the coupling stage imprecise and causes damage to the connector elements of the unit, which must then be replaced together with the centring members, and causes a risk of components of the unit jamming with consequent damage to the entire apparatus.

SUMMARY OF THE INVENTION

The main object of the present invention is to provide a connector unit of the type specified above which is free from the disadvantages mentioned above and which enables wear on the unit in use to be reduced considerably.

This object is achieved by virtue of the fact that the transversely-movable connector part is carried by an auxiliary support structure and it is swingably mounted with respect to it with the interposition of resiliently-yielding transverse position-adjustment means, the position-adjustment means being preloaded so as, in the undeformed condition, to define a rest position corresponding to the aligned condition of the two connector parts.

By virtue of this characteristic the transversely-movable connector part enables very good coupling to be achieved with the other connector part so as to be absolutely free of the risk of jamming, whilst also minimising movements transverse the ideal direction of coupling so as to reduce wear on the unit in use.

Preferably the connector part swingably mounted can also swing relative to the auxiliary support structure in a direction parallel to the direction of coupling so as to compensate for any play in this direction, preloaded resiliently-yielding, axial position-adjustment means being interposed between it and the auxiliary structure.

Thus the swingable or floating connector part as well as compensating for any transverse misalignments with the direction of coupling, compensates for any axial play along the direction of coupling so that the system is even more versatile and less subject to wear and uncertainty of coupling in use. Moreover the swingable connector part formed in accordance with this characteristic, which is movable along three mutually-perpendicular directions, can also compensate extremely effectively for any angular misalignments from the design configuration for coupling and hence can adapt perfectly to any axial misalignment between the two conductor parts, minimising wear in the use.

BRIEF DESCRIPTION OF THE DRAWINGS

Further characteristics and advantages of the present invention will become clearer in the light of the detailed description which follows, made with reference to the appended drawings, provided by way of purely non-limitative example, in which:

FIG. 4 is an elevational view of part of the connector unit, FIG. 5 is a sectioned elevational view of a resilient member used in the unit according to the invention.

DETAILED DESCRIPTION OF THE INVENTION

Figure 1:
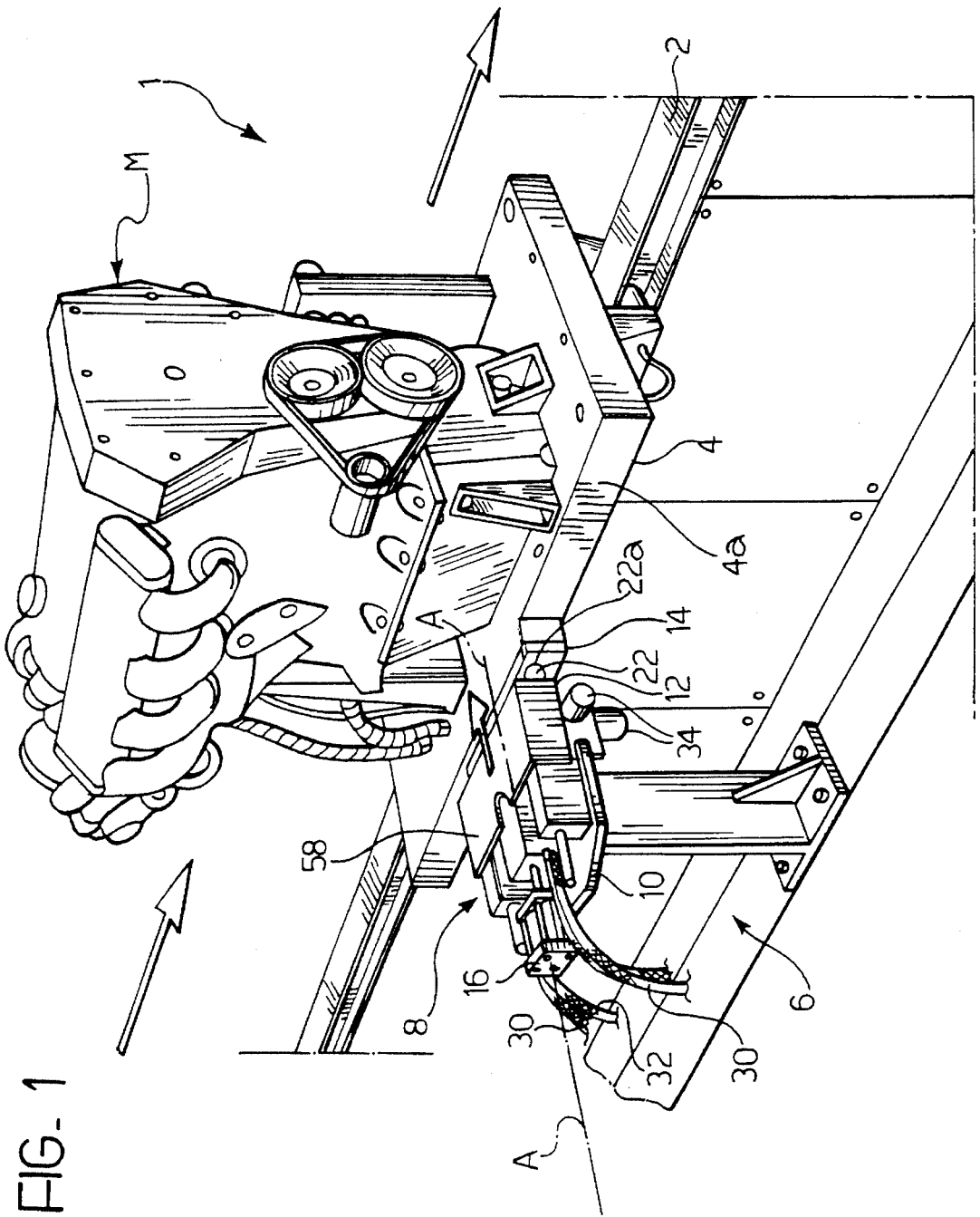
FIG. 1 is a schematic perspective view of a pallet movable along a test line and carrying an engine and stopped at a test station having a connector system according to the invention.

With reference to the drawings, a power unit, or engine, test line is generally indicated 1. An engine M is fixed to a base or pallet 4 which can slide along a guide rail 2. Naturally, even though the present embodiment refers to a line of the mono-rail type, the unit of the invention is also usable on lines of any type, for example including several parallel guide rails or a sliding plane with rollers.

The pallet 4 can stop at one or more engine test stations 6. At the station 6 indicated in FIG. 1, there is an apparatus 8 including a fixed support part 10 on which a first connector part 12 is slidable. The connector part 12 may slide relative to a general axis A of the apparatus 8 perpendicular to the rail 2, the axis A defining a direction of coupling with a second plate-connector part 14 fixed to a side wall 4a of the pallet 4.

The first connector part 12 is driven by an actuator 16, for example an hydraulic cylinder, to move along the direction of coupling so as to be brought into face-to-face contact with the second connector part 14 when the connector parts 12, 14 face each other.

Figure 2:
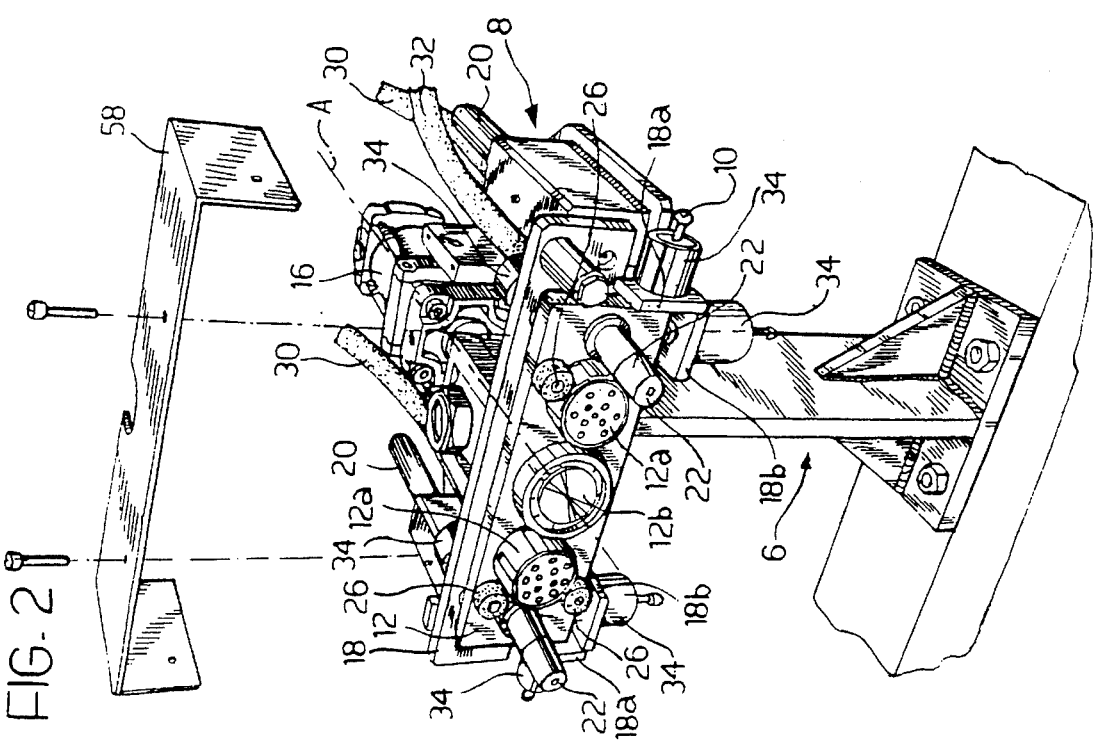
FIG. 2 is an exploded perspective view of part of the connector unit of the invention.
Figure 6:
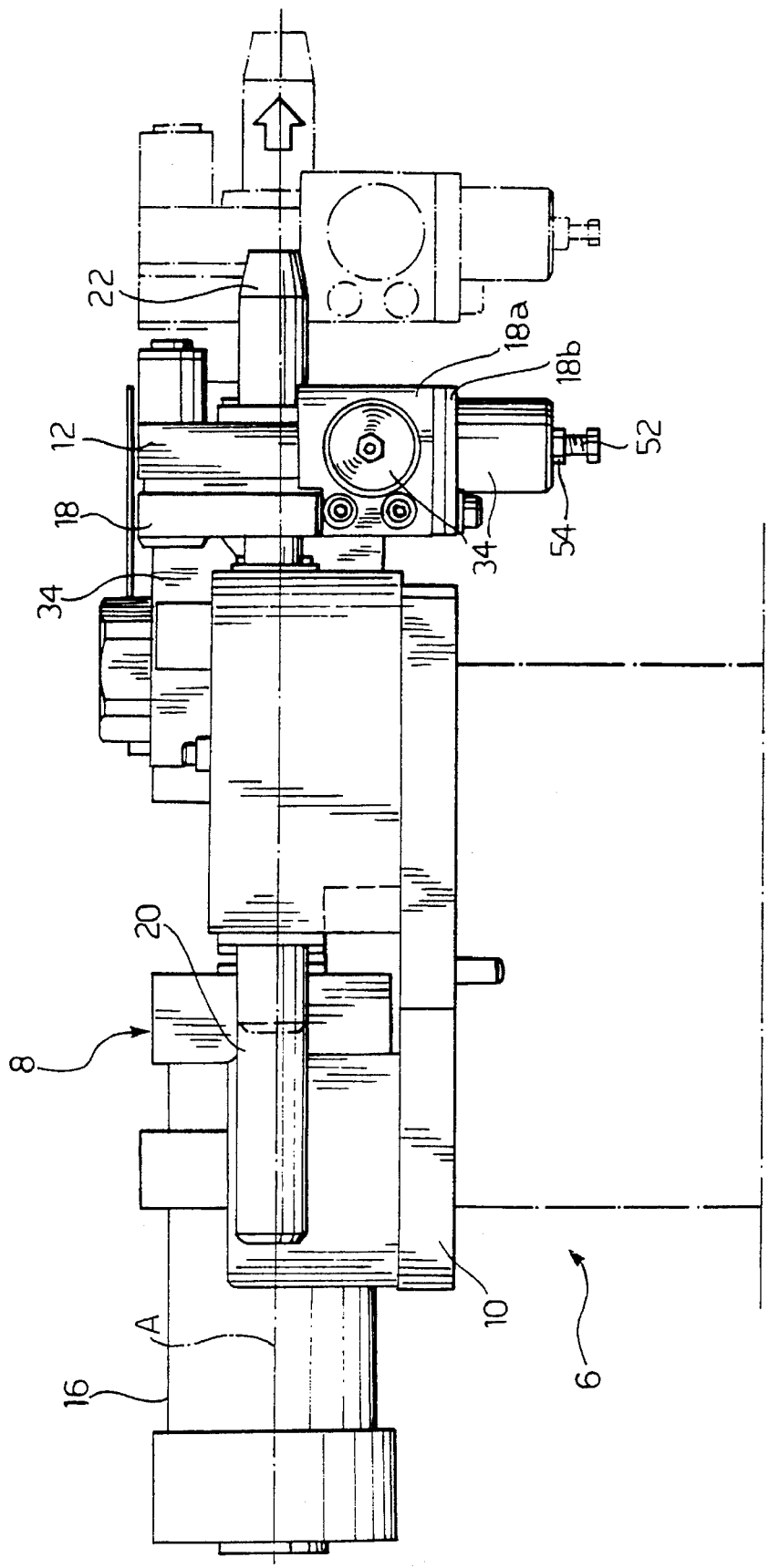
FIG. 6 is a side elevational view of the unit of FIG. 4.

As can be seen more clearly in FIGS. 2 and 4, the first connector part includes a base plate 12 which supports a plurality of connector elements, for example two electrical connectors 12a and a fluid connector 12b of known rapid-engagement type, which can be coupled with respective connector elements (not shown in the drawings) of the second connector part 14.

A pair of pins 22 with tapered ends project perpendicularly from the base plate 12 to serve as centring means relative to the connector part 14 and are adapted to engage in corresponding reference holes 22a (FIG. 1) in the connector part 14 to define the direction of coupling between the connector parts 12 and 14 precisely.

The plate 12 is carried by an auxiliary support structure 18 connected directly to the actuator 16 and interposed between the latter and the plate 12. The auxiliary structure 18 is also plate-like and is slidable relative to the support part 10 on a pair of straight guide rods 20 to which it is fixed, the rods 20 being parallel to each other and slidable relative to the direction defined by the general axis A. The rods 20 are preferably of the recirculating ball type to minimise friction during sliding.

The plate 12 is connected in a floating manner to the auxiliary structure 18 and means are provided for limiting the movement of the plate 12 relative to the structure 18, these being constituted by pins 24 each of which engages a hole 25 in the plate 12 which has a diameter considerably greater than that of the respective pin 24. Each pin 24 has an enlarged head 26 located in correspondence of the face of the plate 12 facing the rail 2 while the opposite end of each pin 24 from the head 26 is engaged by a respective locking nut 24a which is intended to bear against a face of the structure 18 facing the actuator 16. Thus the plate 12 may pivot relative to the structure 18 and move relative thereto along three mutually-perpendicular reference axes, one of which is the axis A.

Figure 3:
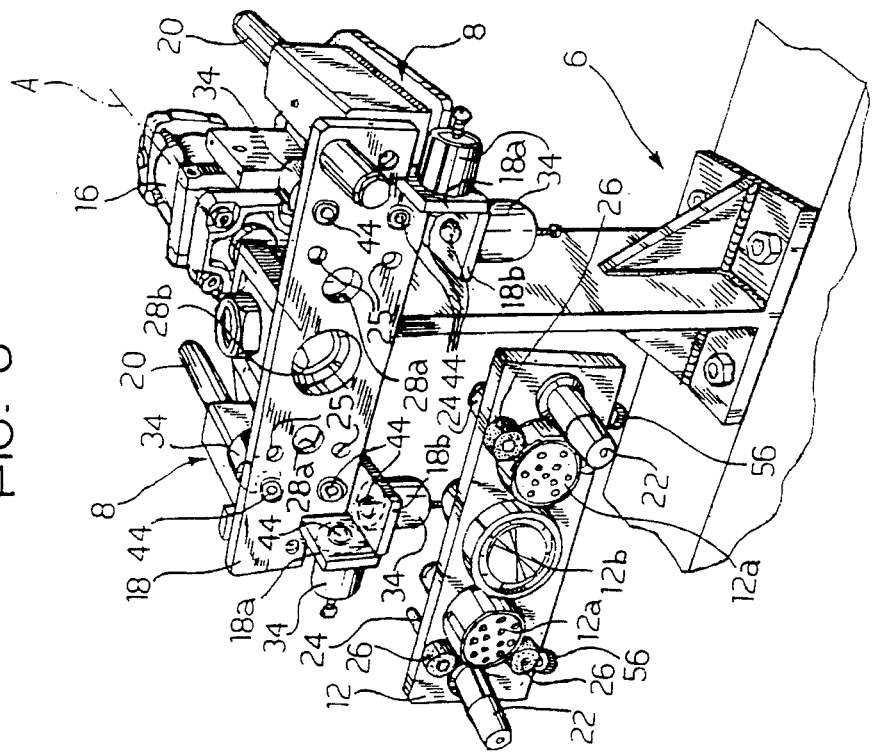
FIG. 3 is a view similar to FIG. 2 in which further elements of the unit are shown.

The auxiliary structure 18 as best seen in FIG. 3 has through-holes 28a, 28b in which respective connector elements 28 (FIG. 4) are located with their ends connected directly to the connector elements 12a, 12b and opposite ends connected to electrical cables 30 or fluid supply ducts 32 (FIGS. 1 and 2).

The lower part of the structure 18 (with reference to the drawings) has a pair of first brackets 18a disposed in parallel vertical planes and a pair of second, coplanar, horizontal brackets 18b. Each bracket 18a, 18b has an associated resilient member 34 for enabling the plate 12 to swine along axes perpendicular to the axis A.

Preferably the auxiliary structure 18 also has four associated resilient members 34 for enabling the plate 12 to swing relative to the structure 18 along the axis A.

Each of the resilient members 34, as shown in greater detail in FIG. 5, comprises a cylindrical housing 36 having a first end 36a fixed to the plate 18 or to the brackets 18a, 18b respectively (FIGS. 2, 3 and 4), with a reduced aperture 39 forming an internal shoulder 39a, and a second end 36b having an external threaded portion 35 and an internal threaded portion 37.

The threaded portion 37 is engaged by a base member 38 having a corresponding external thread. Within the casing 36 are a slidable cylindrical element 42 having an enlarged collar 43 which bears against the shoulder 39a, a coaxial sleeve 41 which is also slidable and a helical spring 40 one end of which bears against the base member 38 while its opposite end engages a seat in the sleeve 41. The element 42 has a hemispherical head 44 which projects through the aperture 39. The base member 38 has, for example, a pair of parallel holes 38a adapted to be engaged simultaneously by corresponding pins of an operating key (not illustrated in the drawings) to enable its distance from the end 36a of the casing 36 to be adjusted in order to set the preloading of the respective spring 40.

At its end 36b, the casing 36 has an outer cup-shaped element 48 which is internally threaded and engages the threading 35. The element 48 has an axial threaded bore 50 engaged by a screw 52 the end of which bears against the base member 38. A nut 54 is screwed onto the screw 52 and acts as a lock nut so that the system constituted by the element 48, the screw 52 and the nut 54 act as a device for preventing unscrewing of the base member 38 from the casing 36. The cup-shaped element 48 also has a pair of parallel holes 48a for engagement by an operating key.

The hemispherical surfaces 44 are located in contact with the plate 12 which is normally retained in a neutral, rest position relative to the direction of coupling, this corresponding to an ideal alignment for coupling of the connector parts 12, 14. The plate 12, in this neutral, rest position, is also slightly advanced along the direction of coupling towards the rail 2 because of the preloading of the springs 40 of the members 34 associated with the plate 18 so as to compensate for any clearance due to excessive remote positioning of the plate 14 when the pallet 4 stops at the station 6. The plate 12 may thus swing about this neutral position, overcoming the resilient preloading of the springs 40 of the elements 34. The radius of the hemispherical surfaces 44 is also selected taking account of the maximum clearances which the system is able to absorb both in one direction and in the opposite one.

A pair of supporting legs 56 of adjustable type, for example by screw-nut couplings, may be interposed between the underside of the plate 12 and the hemispherical surfaces 44 of the resilient members associated with the brackets 18b in order to enable the position of the plate 12 relative to the structure 18 to be adjusted easily and rapidly from outside the apparatus 8.

Preferably the auxiliary structure 18 is made of steel while the plate 12 is of a lighter material, for example aluminium or light alloy, so as to reduce the inertia of the plate 12 during its movement. In this case the portions of the sides of the plate 12 on which the hemispherical heads 44 bear are provided with intermediate elements (not illustrated in the drawings) of a material which is resistant to wear, for example steel plates.

On top of the apparatus 8 is a removable cover 58 which protects the elements of the apparatus 8 from dust and accidental knocks.

In operation, when the pallet 4 stops at the test station 6, the engine M must be supplied with the fluids and the electrical power needed for it to operate by means of the coupling of the plate connector parts 12 and 14. The pallet 4 thus stops in a position such that the connector parts 12 and 14 substantially face each other but generally do not face each other perfectly because of the play between the rail 2 and the pallet 4 and because the position of stoppage on the rail is not defined precisely. For this reason, in the most general case, the connector parts 12 and 14 are not perfectly aligned with their ideal direction of coupling defined by the axis A and the connector part 14 may be in a position which is spaced from the ideal coupling position in a direction parallel to the axis of coupling.

When the pallet 4 stops at the station 6, the cylinder 16 moves the auxiliary structure 18 towards the plate 14 so that the centring pins 22 engage the respective holes 22a by virtue of the tapered shape of their ends and, notwithstanding the play between the parts of the system, enable the plates 12 and 14 to be aligned correctly with each other.

If the plates 12 and 14 are misaligned, the plate 12 reciprocates relative to the auxiliary structure 18 by virtue of the yielding of the resilient members 34 so as to locate itself correctly against the plate 14.

In particular, should the misalignment be solely transverse the ideal direction of coupling, only the resilient members 34 associated with the brackets 18a and/or 18b are stressed; when there is play only in the direction of coupling, this may be recovered thanks at least to part of the preloading or to further stressing of the resilient members 34 associated with the plate 18 according to whether this play causes the plate 14 to be spaced further from or closer to the ideal position of coupling; in the most general case of composite misalignment resulting from transverse misalignment, for example along two mutually-perpendicular axes transverse the axis of coupling, and play in the direction of coupling, all the resilient members 34 deform simultaneously in proportion to the magnitude of the misalignment and play so that the plate 12 couples with the plate 14 and takes up a position inclined to the plate 18 and to the brackets 18a,18b.

At the end of the testing step carried out at the station 6, the actuator 16 recalls the auxiliary structure 18 together, with the plate 12, away from the plate 14 and hence from the pallet 4 and hence the plate 12, subjected solely to the resilient biasing action due to the preloading of the springs 40 of the resilient elements 34, moves into a neutral, rest position corresponding to the ideal position of alignment with the general axis A.

What is claimed is:

1. A connector unit of the multiple-connection, rapid-engagement type connecting an auxiliary support structure to a movable body, comprising a first connector part mounted on an auxiliary support structure and a second connector part which can be coupled face to face as a result of a relative movement along a direction of coupling defined by a general axis of the first connector part, said second connector part being carried by a movable body adapted to stop close to the first connector part so that the first and second connector parts substantially face each other, means for mutually centering the connector parts on the direction of coupling, and said first connector part being movable transverse to the direction of coupling so that, during coupling with the second connector part the transversely-movable connector part can compensate for any transverse misalignment with the direction of coupling, wherein the transversely-movable connector part is swingably mounted with respect to said auxiliary support structure with the interposition of resiliently-yielding, transverse position-adjustment means, said position-adjustment means being preloaded so as, in the undeformed condition, to define a rest position corresponding to the aligned condition of the two connector parts.

2. A unit according to claim 1, wherein preloaded, resiliently-yielding, axial position-adjustment means are interposed between the swingable connector part and the auxiliary structure so that the reciprocable connector part can also swing parallel to the direction of coupling relative to the auxiliary support structure so as to compensate for any play in this direction.

3. A unit according to claim 2, wherein the auxiliary structure is carried by an apparatus including actuator means for driving its movement along the direction of coupling, when the two connector parts face each other, between a position remote from the other connector part and a close position for coupling of the two connector parts.

4. A unit according to claim 2, wherein the transverse and axial position-adjustment means include resilient members each having a respective abutment head with a substantially hemispherical abutment surface for abutment by the swingable connector part.

5. A unit according to claim 4, wherein each of the resilient members includes a preload setting device.

6. A unit according to claim 5, wherein each proload setting device is of the screw/nut type and includes a respective device for preventing unscrewing.

7. A unit according to claim 4, wherein the swingable connector part includes a base plate associated with the auxiliary structure so as to be floating thereon, means being provided for limiting the movement of the base plate in the axial direction.

8. A unit according to claim 7, wherein the auxiliary structure has at least three associated resilient members acting along axes substantially parallel to the general axis, the auxiliary structure also having a pair of resilient members beneath it acting along vertical axes transverse the general axis and a pair of resilient members acting along a common horizontal axis transverse the general axis.

9. A unit according to claim 8, wherein the base plate has vertical support legs of adjustable length each adapted to rest on an abutment head of a respective resilient member.

10. A unit according to claim 9, wherein the base plate is made of a lighter material than that constituting the auxiliary structure.

11. A unit according to claim 1, wherein the second connector part is fixed to a movable support platform of a power unit.

* * * * *

UNITED STATES PATENT AND TRADEMARK OFFICE
CERTIFICATE OF CORRECTION

PATENT NO.   : 5,547,304
DATED        : August 20, 1996
INVENTOR(S)  : Franco Cascio It is certified that error(s) appears in the above-identified patent and that said Letters Patent is hereby corrected as shown below:

On the title page:

In item no. [30], Foreign Application Priority Data, change "Oct. 12, 1993" to --Dec. 10, 1993--.

Signed and Sealed this

Seventh Day of October, 1997

Attest:

BRUCE LEHMAN

Attesting Officer

Commissioner of Patents and Trademarks